(12) United States Patent
Walthert et al.

(10) Patent No.: US 9,902,460 B2
(45) Date of Patent: Feb. 27, 2018

(54) CHASSIS CONTROLLER FOR A HUMAN-POWERED TWO-WHEELED VEHICLE

(71) Applicant: DT SWISS INC, Grand Junction, CO (US)

(72) Inventors: Martin Walthert, Aarberg (CH); Valentin Wendel, Bern (CH); Gernot Elsensohn, St. Anton (AT); Juergen Poesel, Bludenz (AT)

(73) Assignee: DT Swiss Inc., Grand Junction, CO (US)

( * ) Notice: Subject to any disclaimer, the term of this patent is extended or adjusted under 35 U.S.C. 154(b) by 108 days.

(21) Appl. No.: 15/158,095

(22) Filed: May 18, 2016

(65) Prior Publication Data

US 2016/0339989 A1 Nov. 24, 2016

(30) Foreign Application Priority Data

May 18, 2015 (DE) .................. 10 2015 107 707

(51) Int. Cl.
*B60G 17/015* (2006.01)
*B62K 25/04* (2006.01)
(Continued)

(52) U.S. Cl.
CPC ............. *B62K 25/04* (2013.01); *B62K 25/08* (2013.01); *B62K 25/286* (2013.01); *F16F 9/06* (2013.01);
(Continued)

(58) Field of Classification Search
CPC .. B60G 17/018; B60G 17/08; B60G 2202/24; B60G 2300/12; B60G 2400/204;
(Continued)

(56) References Cited

U.S. PATENT DOCUMENTS 5,152,547 A * 10/1992 Davis ................ B60G 17/018
188/313
5,971,116 A 10/1999 Franklin
(Continued)

FOREIGN PATENT DOCUMENTS

DE 69837988 T2 3/2008
DE 102012012532 A1 1/2014

*Primary Examiner* — Toan C To
(74) *Attorney, Agent, or Firm* — Laurence A. Greenberg; Werner H. Stemer; Ralph E. Locher

(57) ABSTRACT

A chassis controller controls a shock absorber of a bicycle for spring-assisted damping of a relative movement between a first and a second connecting unit. A damper device and a spring device absorb shocks between the connecting units. A sensor device acquires measurement data relating to a relative movement of the connecting units. A control device controls the shock absorber. The sensor device has a scaling device connected to one of the connecting units and the sensor device extends over a measuring section in a direction of movement of the relative movement. The scaling device has a structure with magnetic properties that repeat periodically over the measuring section. The sensor device has a detector head which interacts with the scaling device, is connected to the other of the connecting units and determines a position of the shock absorber.

30 Claims, 6 Drawing Sheets

(51) Int. Cl.
*F16F 9/53* (2006.01)
*B62K 25/08* (2006.01)
*B62K 25/28* (2006.01)
*F16F 9/06* (2006.01)
*F16F 9/50* (2006.01)
*B62K 25/30* (2006.01)
*F16F 9/46* (2006.01)

(52) U.S. Cl.
CPC ............... *F16F 9/50* (2013.01); *F16F 9/535* (2013.01); *B62K 25/30* (2013.01); *B62K 2025/044* (2013.01); *F16F 9/46* (2013.01); *F16F 9/53* (2013.01); *F16F 2224/0208* (2013.01); *F16F 2224/0241* (2013.01)

(58) Field of Classification Search
CPC ........ B60G 2600/02; B60G 2600/1882; B62K 25/04; B62K 25/28; B62K 2025/044; B62K 2025/048; F16F 9/53
USPC ................. 280/5.5, 5.512, 5.514; 701/37
See application file for complete search history.

(56) References Cited

U.S. PATENT DOCUMENTS

| | | | |
|---|---|---|---|
| 6,418,360 B1* | 7/2002 | Spivey | B60G 17/0152 280/5.501 |
| 9,051,988 B2 | 6/2015 | Battlogg et al. | |
| 9,273,747 B2* | 3/2016 | Walthert | B62K 23/02 |
| 9,452,654 B2* | 9/2016 | Ericksen | B60G 17/016 |
| 2006/0065496 A1* | 3/2006 | Fox | B62K 25/04 188/275 |
| 2010/0066051 A1* | 3/2010 | Haugen | B60G 13/14 280/124.157 |
| 2011/0127706 A1* | 6/2011 | Sims | B60G 17/018 267/221 |
| 2012/0253598 A1* | 10/2012 | Shirai | B62K 25/04 701/37 |
| 2012/0253599 A1* | 10/2012 | Shirai | B62K 25/04 701/37 |
| 2013/0144489 A1* | 6/2013 | Galasso | B60G 17/018 701/37 |
| 2013/0341843 A1* | 12/2013 | Battlogg | B62K 25/04 267/140.14 |
| 2014/0210180 A1* | 7/2014 | Hudak | B62K 25/04 280/274 |
| 2014/0316652 A1* | 10/2014 | Ericksen | F16F 9/512 701/37 |
| 2015/0130153 A1* | 5/2015 | Chen | B62K 25/04 280/124.108 |
| 2016/0153515 A1* | 6/2016 | Ebersbach | F16F 9/34 188/266.3 |
| 2016/0304157 A1* | 10/2016 | Craven | B62M 6/50 |
| 2016/0339987 A1* | 11/2016 | Walthert | B62K 25/04 |
| 2016/0339990 A1* | 11/2016 | Walthert | B62K 25/04 |
| 2016/0368559 A1* | 12/2016 | Voss | B62K 25/286 |

* cited by examiner

CHASSIS CONTROLLER FOR A HUMAN-POWERED TWO-WHEELED VEHICLE

The present invention relates to a chassis controller for an at least partially human-powered two-wheeled vehicle and, in particular, a bicycle having at least one controllable shock absorber.

Shock absorption has a large influence on the riding properties and therefore constitutes an important feature of bicycles and, in particular, racing bicycles. Shock absorbers permit improved ground contact and permit sporty riding even in extreme off-road conditions. Bicycles with shock absorption generally have a suspension fork which is frequently supplemented with a rear wheel damper. A shock absorber usually comprises a spring device for absorbing shocks which occur and a damping device for damping the spring oscillation. In the case of shock absorbers for the rear wheel, the spring device and the damper device are generally embodied as an integral unit. In the case of suspension forks, the damping device and the spring device can also be arranged separately.

The setting of the damping and spring properties is generally indispensable for the optimum utilization of the advantages of shock absorption. Criteria for the setting here are, for example, the weight of the rider, and his riding style as well as the properties of the terrain in which the bicycle is to be ridden. For this purpose, it is generally necessary to adjust the shock absorber, during which adjustment a series of parameters for providing damping and suspension have to be adjusted and matched to one another. However, such adjustment is not always unproblematic, particularly for beginners. In extreme cases it is even possible that the travel properties are worsened as a result of a combination of unfavorable settings. In addition, during travel in off-road conditions it is often not possible for the properties to be changed in a way which would actually be appropriate or necessary during the travel.

Therefore, electrically controllable shock absorbers have become known in which electrical switching of the shock absorber properties can take place.

DE 10 2012 012 532 A1 by the applicant has disclosed a shock absorber and a method for operating a shock absorber, in which the damper device comprises a controllable damping valve having a field-generating device with which a field-sensitive medium, such as a magneto-rheological fluid can be influenced in order to influence the damping force of the damper device by applying a field strength of the field-generating device. In this known absorber, the damping force of the damper device is set in real time. For this purpose, events in the form of shocks are detected, and a relative speed of the ends of the damper is acquired periodically. For the purpose of damping, a characteristic value is derived from the relative speed and in turn a field strength which is to be adjusted is derived from a damper characteristic curve with the characteristic value. The field strength which is to be adjusted is generated in real time with the field-generating device in order to adjust the damping force in real time. With this known shock absorber, it is possible to deal with all types of shocks in a flexible fashion, since after the detection of relative movement the shock absorber is set directly in an appropriate manner. For precise control, a precise sensor system is necessary. With this known shock absorber, a magnetic potentiometer is used in which the magnet predefines the setting of the potentiometer, with the result that the spring compression and spring extension state of the shock absorber can also be detected in absolute terms directly from the position of the potentiometer.

The known shock absorber supplies very satisfactory results. An even more precise sensor is desirable for even better control. However, it is to be noted here that in the field of use which is provided, the cost of such sensors plays a decisive role. Furthermore, the production numbers are not so high as in, for example, motor vehicles. Furthermore, the sensors have to withstand even tougher environmental conditions since they can be subjected directly to the external temperatures in the depths of winter and can heat up to high temperatures in the summer, and also in the winter. Therefore, a temperature interval of 60° or 80° or even 100° Kelvin is possible. The temperature range in which the sensor has to operate reliably can extend during operation between, for example, minus 30° C. and plus 80° C.

Therefore, the object of the present invention is to make available a chassis controller for an at least partially human-powered two-wheeled vehicle having at least one controllable shock absorber, with which identical and in particular better results can be achieved with moderate or even reduced effort.

This object is achieved by means of a chassis controller having the features of claim 1. Preferred developments of the invention are the subject matter of the dependent claims. Further advantages and features of the present invention emerge from the general description and the description of the exemplary embodiments.

The chassis controller according to the invention for an at least partially human-powered two-wheeled vehicle comprises at least one controllable shock absorber. The shock absorber comprises two connecting units or components which can move relative to one another and between which at least one damper device and at least one spring device are provided for absorbing shocks. Furthermore, at least one sensor device is provided for acquiring measurement data at least relating to a relative movement of the connecting units with respect to one another. At least one electrical control device is used to control the at least one shock absorber. In this context, the sensor device comprises at least one scaling device which is connected to one of the connecting units of the shock absorber and said sensor device extends over a measuring section in a direction of the relative movement. The scaling device can also be referred to as a structured scaling device and has a structure with magnetic properties which repeat periodically over the measuring section. In particular, each period, or certainly at least essentially each period of the periodic structure, forms a sensor section of the sensor device. It is possible that the scaling device forms the structure with periodically repeating magnetic properties. The sensor device comprises a detector head which interacts with the scaling device, is connected to the other of the connecting units of the shock absorber, and has the purpose of determining a position of the shock absorber.

The chassis controller according to the invention has many advantages. A considerable advantage of the chassis controller according to the invention is that the structured scaling device of the sensor device has a structure with periodically repeating magnetic properties. As a result, high-resolution determination of locations can be carried out since the detector head is oriented toward the periodic structure and, furthermore, high-precision determination of positions can be carried out by means of evaluation of, for example, the magnetic field strength.

In particular, the structure is embodied as a regular periodic structure which has changing and periodically repeating magnetic properties. In this context, the scaling device has a structure, and each period of the periodic structure forms a scaling section or a sensor section of the sensor device.

The scaling device preferably has a regular periodic structure of changing magnetic and/or electrical properties. The individual periods of the periodic structure can be at equal or else different intervals. It is therefore possible, for example, that relatively small (or relatively large) period intervals occur toward one end.

The scaling device can be embodied as a sensor strip and extends over a measuring section or measuring length. In this context, the scaling device preferably has a repeating pattern.

The sensor device can comprise two (or more) sensor parts, wherein the first sensor part is connected to the one connecting unit, and the second sensor part is connected to the other connecting unit. One of the two sensor parts forms the detector head or comprises the detector head, and on the other of the two sensor parts, the (structured) scaling device is provided, embodied or attached. The (precise) position is preferably determined by means of interpolation, and the precision of the determination of position is increased by interpolation.

In a preferred development of the invention, the damper device has a first damper chamber and at least one second damper chamber. In this context, the first damper chamber and the second damper chamber are coupled to one another via at least one damping valve. In particular, at least one damping valve can preferably be controlled electrically. The first damper chamber and the second damper chamber are preferably separated from one another by means of a damping piston which is connected to a piston rod. The damping valve is preferably embodied in the damping piston.

In a preferred development, the at least one damping valve or at least one damping valve is assigned at least one magnetic field-generating device which serves to generate and control a magnetic field in at least one damping duct of the damping valve. A magneto-rheological medium is provided in the damping duct. It is also possible for the magneto-rheological medium to be located in both damper chambers. At least one property of the shock absorber can be adjusted by controlling the damping valve, and the damper device can be controlled as a function of the measurement data of the sensor device.

The detector head is preferably arranged adjacent to the scaling device. The detector head is particularly preferably arranged spaced apart from and adjacent to the scaling device. This permits contactless and wear-free detection.

In preferred configurations, the scaling device has sensor sections, wherein each sensor section preferably corresponds to one period of the structure. At least one sensor section or essentially each or precisely each sensor section preferably has a length of at least 0.25 mm in the direction of movement. In this context, a sensor section is formed, in particular, by a period of the periodic structure of the scaling device. The sensor section particularly preferably has a length of at least 0.5 mm and preferably at least 1 mm in the direction of movement. A length of a sensor section of 2 mm, 3 mm, 4 mm, 5 mm, 6 mm, 8 mm or 10 mm or more is also possible and preferred.

The measuring section of the scaling device in the direction of movement particularly preferably corresponds at least essentially to one damper stroke. It is possible that the measuring section is somewhat shorter than a damper stroke. A length of the measuring section is preferably as long as a damper stroke and can also be somewhat longer. The measuring section can also be significantly longer than the damper stroke in the direction of movement. For example it is possible that in the case of a linear movement of the damper device the measuring section extends in a zigzag shape or in a helical shape or in some other curve form in the direction of movement, with the result that the curve length of the measuring section is significantly larger than the damper stroke.

In other preferred configurations, the shock absorber operates rotationally, with the result that for the purpose of damping the two connecting units of the shock absorber are pivoted or rotated with respect to one another. It is then preferred that the measuring section extends on a curved path about the pivoting axis or rotational axis.

For example, the scaling device can be arranged on an internal circumference or an external circumference of a component which is permanently connected to one of the connecting units.

In preferred developments, the detector head comprises at least one detector and particularly preferably a multiplicity of detectors, wherein the detector signal of the at least one detector can be evaluated. In particular, it is possible that a sensor signal is generated from the multiplicity of the acquired detector signals within or outside the detector head.

The detector head preferably has a multiplicity of detectors which are arranged offset in the direction of movement. In this context, it is possible that the detector signals of the individual detectors can be evaluated in such a way that overall a sensor signal is output which has a higher resolution or higher precision. In this context, the one sensor signal can be composed again from a plurality of channels or phases. The individual detectors of the detector head preferably serve to detect a relative position relative to the periodic structure of the scaling device. The resolution and the precision can be increased considerably by means of two detectors which are offset relative to the scaling device.

In particular, a signal strength of the individual detector signals can be evaluated in order to permit the position to be determined with a spatial resolution which is less than a length of a sensor section. In particular, the spatial resolution is more precise than 0.1 mm, and a spatial resolution of 50 µm or less than 10 µm is preferably made possible. The spatial resolution can be more precise than 5 µm or less than 2 µm here. Resolutions of 1 µm and better are also preferred.

Since the detector head interacts with the scaling device, a position of the shock absorber can be determined from the intensity measured with the detector head, on the basis of the local physical and/or magnetic property of the scaling device. The measured intensity can be, for example, the field strength of an electrical or magnetic field. The magnetic properties of the structure can influence a magnetic field measured with the detector head, or else an effective electrical field strength. It is also possible to measure a capacitive variable or the like, which is influenced by the magnetic properties of the structure and the relative position of the detector head.

In particular, a ratio of a length of a sensor section to a spatial resolution of the determination of the position is more than 100 and preferably the ratio is larger than 1000.

The signals of at least one detector can preferably be evaluated in the sensor device in such a way that variables such as the absolute position or relative position, speed, direction, acceleration or also a jolt which are dependent on the position or movement of the shock absorber can be output via the interface.

In particularly preferred configurations, the (structured) scaling device comprises a multiplicity of field-generating units. In this context, such field-generating units can be embodied, for example, as permanent magnets or else as electrical coils. Permanent magnets have the advantage that they continuously generate a magnetic field and therefore make available a structured magnetic field at the scaling device independently of a supply of current. In such cases, a magnetic field sensor is preferably used as a detector at the detector head. At least two magnetic field sensors are preferably used as detectors. Such magnetic field sensors can comprise, for example, an electrical coil or a Hall sensor or other sensor types or be embodied in such a way.

High-precision determination of locations can be made possible by using a multiplicity of field-generating units on the scaling device and by means of at least one magnetic field sensor as a detector on the detector head. In this context, the detector head acquires a signal strength of the magnetic field which is emitted by the field-generating unit, with the result that positions can be determined precisely by means of the intensity when there is a relative movement of the connecting units. At least one field sensor in the detector head preferably evaluates the strength and shape of the field, and in the case of vectorial representation of the field therefore the direction and magnitude of the field, and generates a signal corresponding to the relative position.

If the scaling device has a, for example, precise periodic structure, only a relative change in position, but not the absolute position, can be determined directly from the signals of the detector head. It is preferred that a counter be fitted in the control device, which counter detects the number of period passes and the direction of the change in period, with the result that precise determination of positions is possible at any time.

It is also possible for end sensors to be provided which permit the position of the location to be calibrated at or in the vicinity of the respective end of the stroke. For the purpose of calibration at least one index is preferably used which corresponds to a precisely determined position which is frequently reached during normal operation. In this context, this index can correspond to a specific mark or local configuration of the scaling device, or can be generated as a separate signal of an additional field sensor in the detector head.

In particularly preferred configurations, the scaling device comprises at least a multiplicity of permanent magnets as magnet units. In a simple variant, the permanent magnets are arranged periodically with alternating north-south poles, or alternating polarity. However, it is also possible for the scaling device to be embodied as a magnetic strip in which permanent magnets with non-magnetic regions or with regions with low magnetization alternate periodically. It is therefore also possible to arrange alternately poles of the same polarity with different strengths (for example north poles). Alternatively, the plurality of permanent magnets with different strengths are arranged in one period. In these variants, two or more detectors are preferably provided on the detector head and are arranged in such a way that a direction of movement of the relative movement can also be detected.

In one preferred development, at least a number of, in each case, two directly adjacent magnet units and, in particular, permanent magnets have a different polarity. However, the same orientation of polarity with, for example, different field strength is also possible.

A multiplicity of magnet units or permanent magnets preferably forms a magnet stack. The magnet stack then essentially makes available the scaling device. An (in particular thin) separating element is provided between the permanent magnets. A length of a separating element is preferably less than 25% and, in particular, less than 10% and preferably less than 5% of a length of a permanent magnet in the longitudinal direction of the magnet stack.

In such configurations, the scaling device comprises a multiplicity of magnetic poles which are spaced apart from one another in a direction of movement. In particular, the poles are preferably arranged in an alternating fashion (or transversely with respect to one another), with the result that in the case of a relative movement the detector head respectively detects a north pole and a south pole in an alternating fashion. The detector head acquires the strength of the magnetic field and interpolates the location or derives the location from the signals or the local magnetic field. For example, in preferred configurations it is the case that a type of sine signal is expected. The detector head acquires the field strength signal and the location is obtained by means of the measured intensity. In this context, two or more detectors, which are, in particular, arranged in a positionally fixed fashion and preferably offset in the direction of movement with respect to one another permit better selection and better precision and resolution. In these refinements, at least two magnetically different components which respectively alternate over the different periods extend over a period of the scaling device. In the case of two detectors which are arranged offset with respect to one another in the direction of movement, one detector can acquire a type of sine signal and one a type of cosine signal, with the result that the spatial resolution can be increased and the direction of movement detected.

The scaling device is preferably embodied in at least partially ferromagnetic fashion and has a periodic and ferromagnetically embodied structure.

It is possible the scaling device has a ladder-like and/or tooth-like structure. For example, the scaling device can be embodied as a toothed rack or as a ladder structure. In this context, the structure can also be embodied in a three-dimensional fashion, preferably as a lateral surface or part of the lateral surface of a cylinder in the direction of movement, with the result that the structure appears, for example in one direction, in the form of a circular arc, ring or, for example, fin. In such structures made of ferromagnetic materials or from permanent magnets, the magnetic properties also change periodically.

In such configurations it is possible and preferred that at least one magnetic field-generating device is arranged on the detector head. In particular, the magnetic-field generating device is also attached to the detector head. The magnetic field-generating device can be embodied as a permanent magnet or else as an electrical coil. In such a configuration, it is possible that, for example, a ferromagnetic toothed rack is fitted to the scaling device, and that a permanent magnet is provided as a magnetic field-generating device and, for example, two detectors are provided, on the detector head. In this context, the measurement functions in such a way that the magnetic field generated by the magnetic field-generating device is changed by the ferromagnetically embodied structure of the scaling device, since the magnetic field is preferably concentrated in the ferromagnetic areas of the scaling device. As a result, the (two) detectors of the detector head, which are embodied as magnetic field sensors, correspondingly detect different magnetic fields depending on the position of the shock absorber, with the result that highly precise determination of the location is possible by evaluating the intensity. In the simplest case, it is not possible to determine the location in absolute terms here again but instead only relative determination of the spring compression state is possible. However, this can be compensated by counting the period passes or also by means of other measures.

In another and particularly preferred configuration, the detector head (also referred to as measuring head) is designed and configured to generate an magnetic alternating field with the magnetic field-generating device. The detector head is, furthermore, designed and configured to detect a field strength of the magnetic alternating field which is influenced by the scaling device, in order to derive the position of the shock absorber from the field strength. In such a configuration, a further measuring variant in which the scaling device has, for example, a periodic structure with electrically conductive elements is obtained.

For example, an electrically conductive toothed rack or a ladder-like structure can be provided. In this variant, the magnetic field-generating device of the detector head generates a sufficiently high-frequency magnetic alternating field which generates, in electrically conductive components, corresponding eddy currents which in turn generate magnetic alternating fields which are opposed to the excitation. As a result, the magnetic field lines of the magnetic field-generating device are deflected virtually about the electrically conductive structure of the scaling device, with the result that the detectors, embodied as magnetic field sensors, of the detector head derive the position of the shock absorber from the respectively detected field strength. In such a variant, for example an electrically conductive toothed rack or a periodic arrangement of electrically conductive parts is used to determine positions.

In all the configurations it is preferred that the spring device comprises an air spring with a spring housing and at least one air chamber provided therein. The spring housing particularly preferably surrounds the damper device at least partially. This applies, in particular, to shock absorbers which are arranged on the rear wheel.

In these configurations it is possible that the detector head is arranged at least partially within the spring housing. The damper device is preferably connected to a suspension piston which divides the air chamber into a positive chamber and a negative chamber.

The detector head is particularly preferably attached to the suspension piston. It is also possible that the detector head is arranged in a radially outer region. The detector head could, for example, also be arranged radially on the inside of the suspension piston seal.

It is preferred that at least a considerable portion of the spring housing is composed of a composite fiber material. In this context, the spring housing can be composed at least partially or else completely of at least one composite fiber material. It is possible, for example, that the cylindrical part of the housing or the housing—with the exception of a housing lid—is composed essentially or else completely of composite fiber material.

In these and other configurations it is possible that the scaling device is mounted, attached or held on the spring housing. In this context, the scaling device can be attached to the outside of the spring housing, in particular when the spring housing is at least partially composed of a composite fiber material. However, it is also possible that the scaling device is integrated into the spring housing. In these cases, the detector head can measure through the spring housing completely or partially from the inside or from the outside. This is advantageous, in particular, when measurement is to be carried out through the spring housing by means of magnetic alternating fields.

One preferred configuration provides a non-ferromagnetic spring housing, particularly preferably made of aluminum, which is permanently connected to the scaling device which generates a magnetic field which is dependent on the position.

It is also possible and preferred that the scaling device and the detector head are attached to the outside of the shock absorber. Such a development permits simple access to the sensor device.

In all the configurations it is possible and preferred that the scaling device has additional absolute position marks, wherein a position mark can be embodied as, for example, an end position sensor. Such position marks can also be embedded in the periodic structure of the scaling device. For example, in the case of a magnetic periodic structure, an equal portion of a field strength can change over the length of the scaling device, with the result that the local changes in the field strength for the determination of positions and an average value of a field strength or the equal proportion define the absolute location over one period.

It is also possible to use position marks by means of mechanical or capacitive switches (for example limit switches) or the like.

The scaling device is preferably divided, in particular, physically or possible virtually, into at least two paths which are parallel in the direction of movement by means of different magnetic encodings.

The scaling device is particularly preferably arranged inside the damper housing or inside the spring housing. Such a construction permits a particularly compact and robust design. A design with a sensor arranged outside the housing (damper housing or spring housing) is then not necessary. Such a sensor which is located on the outside has parts which can move with respect to one another and which are therefore not protected against soiling or the effect of an external force.

With the invention, it is possible to make available a cost-effective shock absorber which can be controlled in a highly precise way, and therefore a corresponding chassis controller. In simple cases, the chassis controller is composed of a controllable shock absorber and the associated control device which can be integrated into the shock absorber or mounted on the outside thereof. It is also possible that a central control device is provided which interacts with a local control device on the shock absorber. Furthermore, developments of the chassis controller and of the shock absorber have features such as are described in DE 10 2012 012 532 A1. In particular, the control of the damping functions in accordance with characteristic values as described in DE 10 2012 012 532 A1, with the result that similar curve profiles are basically obtained in the case of shocks.

Further advantages and features of the present invention are apparent from the exemplary embodiments which are explained with reference to the appended figures.

Exemplary embodiments and variants of the invention relating to a chassis controller 300 with a damper device 1 for a bicycle are described with reference to the appended figures.

Figure 1:
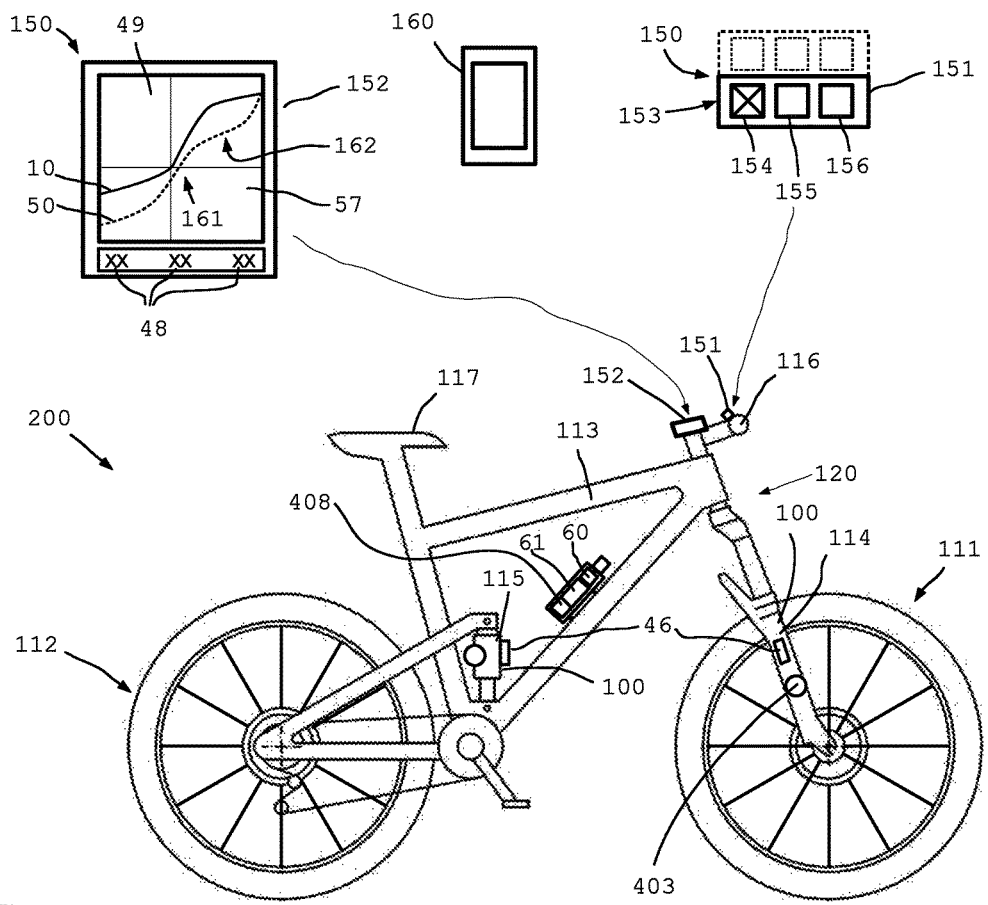
FIG. 1 shows a schematic illustration of a bicycle with a chassis controller according to the invention.

FIG. 1 shows a schematic illustration of a bicycle 200 which is embodied here as a mountain bike and has a frame 113 and a front wheel 111 and a rear wheel 112. Both the front wheel 111 and the rear wheel 112 are equipped with spokes and can have the illustrated disk brakes. A gearshift serves to select the transmission ratio. Furthermore, the bicycle 200 has a steering device 116 with handlebars. Furthermore, a saddle 117 is provided.

The front wheel 111 has a shock absorber 100 which is embodied as a suspension fork 114 and a shock absorber 100 which is embodied as a rear wheel damper 115 is provided on the rear wheel 112.

The chassis controller 300 comprises, in the simplest case, a shock absorber 100 and a control device 46. It is also possible for the chassis controller 300 to comprise two shock absorbers 100 (suspension fork and rear wheel shock absorber), on each of which a control device 46 is provided. Alternatively, the chassis controller 300 comprises two shock absorbers 100 and a central control device 60. The chassis controller 300 particularly preferably comprises two shock absorbers 100 and a central control device 60 and, in each case, a control device 46 on each shock absorber. The (central) control device 60 can be used to make the pre-settings and to coordinate the two shock absorbers.

The central control device 60 is provided here together with a battery unit 61 in a drinking bottle-like container and is arranged on the lower tube, where otherwise a drinking bottle is arranged, but can also be arranged in the frame. The central control device 60 can also be arranged on the handlebars 116.

The central control device 60 is used here in the exemplary embodiment according to FIG. 1 to control the chassis and controls here both the suspension fork 114 and the rear wheel shock absorber 115, in each case separately and here, in particular, synchronously or in such a way that they are coordinated with one another.

The shock absorbers 100 and further bicycle components can be controlled as a function of a wide variety of parameters, essentially also on the basis of data acquired by sensor. If appropriate, the spring properties and/or damping properties of the saddle support can also be adjusted. It is possible that the central control device 60 can also be used to control the shifting operation for setting various transmission ratios. In particular, ageing of the damping medium, of the spring device and of further components can also be taken into account. It is also preferred to take into account the temperature of the shock absorber 100 (suspension fork 114 and/or rear wheel shock absorber 115). In this context, in particular the temperature of at least the damper device 1 can be taken into account.

In addition, each shock absorber 100 here has at least one control device 46 on an electronics unit which is provided here in a replaceable fashion. The electronics units can each have separate battery units. However, an energy supply by means of the central battery unit 61 or assistance or operation by means of a dynamo or the like is preferred.

The chassis controller 300 and the central control device 60 are operated by means of operator control devices 150. Two operator control devices 150 are provided, specifically an activation device 151 and an adjustment device 152. The activation device 151 has mechanical input units 153 at the lateral ends or in the vicinity of the lateral ends of the handlebars 116. The adjustment device 152 can be embodied as a bicycle computer and can also be positioned on the handlebars 116. However, it is also possible that a smart phone 160 or a tablet or the like is used as the adjustment device 152 and is stored, for example, in the user's pocket or backpack if the settings are not changed.

The activation device 151 comprises here three mechanical input units as operator control elements 154, 155, 156 for operating the shock absorber 100. It is possible that an activation device 151 for the suspension fork 114 is arranged at one end of the handlebars 116, and that a corresponding further activation device 151 for the rear wheel shock absorber 115 is provided at the other end of the handlebars. It is also possible that both shock absorbers are controlled synchronously with one activation device 151. It is also possible that an activation device with, for example, six different operator control elements for setting the two shock absorbers 100 is arranged at one lateral end of the handlebars 116.

The activation device 151 is embodied in a considerably more robust and resistant fashion than the operator control device 152 and is securely mounted on the handlebars 116 here. The individual operator control elements 154 to 156 embodied as press switches or pushbutton keys each have protection according to IP54 or better IP67 in accordance with DIN EN 60529. Protection is provided against shocks by at least IK06 according to DIN EN 622622. Therefore, the operator control elements 154 to 156 are sufficiently protected during normal operation, and therefore no damage occurs to the operator control elements during operation, even in the event of normal shocks or the like. Furthermore, the robust operator control elements 154 to 156 ensure there is a reliable operator control even during downhill travel or the like.

In contrast, the adjustment device 152, which is, for example, clipped onto the handlebars or remains in the user's pocket or backpack, provides considerably more and/or more easily comprehensible adjustment possibilities and can be used to adjust a displayed damper characteristic curve 10 in at least two or more regions 161, 162 etc. in order to set the desired damper properties. The adjustment device 150 has a display 49 and can also output data 48 which relate, for example, to the damper settings or else contain data relating to the current velocity etc. In addition to, or instead of, changing the damping, at least one spring property or the characteristic of the suspension can also be changed by means of the adjustment devices 150 or 152. In this context, in particular the spring hardness during spring compression and/or spring extension can be influenced. Furthermore, if appropriate the position of rest can be set. For example, the suspension fork 114 can be lowered in the case of (steep) uphill travel, as a result of which the angle of inclination of the bicycle 200 is reduced.

The display 49 is embodied, in particular, as a graphic operator control unit or touchscreen 57, and the user can therefore touch, for example, a displayed damper characteristic curve 10 with his fingers and change it by dragging movements. As a result, on the basis of the continuous damper characteristic curve 10 which is displayed it is possible to generate the damper characteristic curve 50 which is also displayed and which is then used immediately for the vehicle controller 300. It is also possible to change the damper characteristic curves 10, 50 while traveling. Here, not only the damping is changed but it is also possible to change the suspension at the same time or to change only the suspension.

The adjustment device 152 can also serve as a bicycle computer and display information about the current speed as well as about the average speed and/or the kilometers per day, kilometers for a tour or round and the total number of kilometers. It is also possible to display the current position, the instantaneous altitude of the section of route being traveled on and the route profile as well as a possible range under the current damping conditions.

Figure 2:
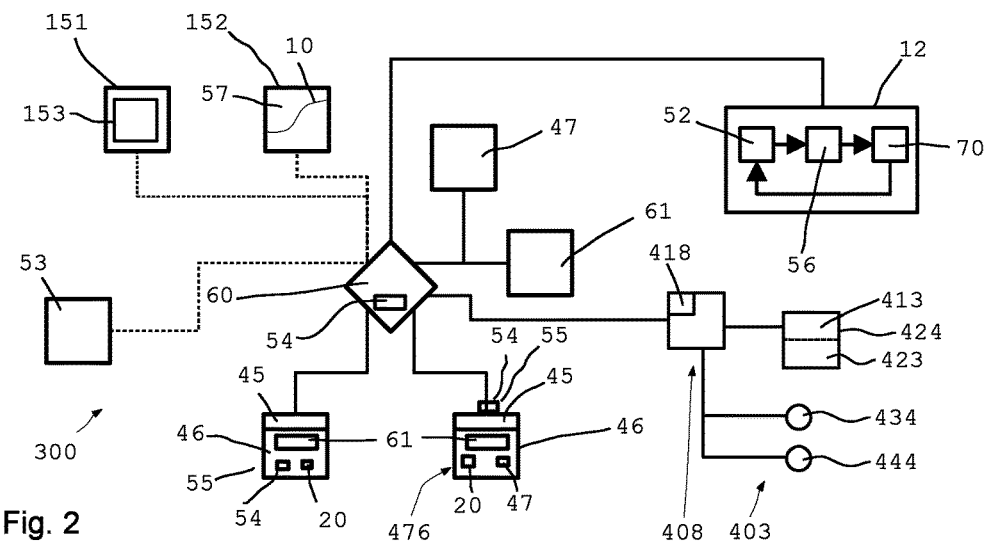
FIG. 2 shows a schematic illustration of the chassis controller.

FIG. 2 shows a schematic illustration of the chassis controller 300 and of the communication connections of a number of components which are involved. The central control device 60 can be connected in a wire-bound or wireless fashion to the individual components. For example, the control device 60 (or 46) can be connected to the other components via WLAN, Bluetooth, ANT+, GPRS, UMTS, LTE or other transmission standards. If appropriate, control device 60 can be connected in a wireless fashion to the Internet 53 via the connection illustrated by a dotted line.

The control devices 46 and 60 are connected to at least one sensor device 20 or to a plurality of sensors. The operator control devices 150, specifically the activation device 151 and the adjustment device 152, are coupled in a wire-bound or wireless fashion to the control device 60 at least temporarily. The activation device 151 is preferably coupled in a wireless or wire-bound fashion to the control device and can have a separate battery (e.g. button cell).

The robustly constructed activation device 151 has at least one mechanical input unit 153 in the form of a switch or pushbutton key or the like to be used for outputting a resetting command to the control device 60 for switching at least one damper property and/or spring property. This can be, for example, the activation of a lockout or the activation of a rocking suppression device or the adjustment of the damper hardness and/or the spring hardness. A separate operator control knob or the like is preferably provided for each of these properties. However, it is also possible for a single mechanical input unit 153 to be used for switching the individual possibilities. The mechanical input unit 153 or another mechanical input unit can be used to change the suspension properties. For example, the suspension fork can be lowered and the rear wheel damper correspondingly adapted.

The adjustment device 152 has here a graphic operator control unit such as a touch-sensitive screen and can display, inter alia, the current damper characteristic curve 10 on the display 49.

The control device 60 is connected to control devices 46 of the shock absorbers 100 on the front wheel and on the rear wheel via network interfaces 54 or radio network interfaces 55. The control device 46 which is possibly provided on each shock absorber 100 performs the local control and can have, in each case, a battery or else be connected to the central battery unit 61. It is preferred that both shock absorbers are controlled via the control device 60. It is also possible for the shock absorbers 100 to be controlled locally by means of assigned control device 46.

Each shock absorber 100 is preferably assigned at least one sensor device 20 in order to detect relative movements between the components or connecting units 101 and 102. In particular, a relative position of the components 101 and 102 relative to one another can be determined. The sensor device 20 is preferably embodied as a (relative) travel sensor or comprises at least one such sensor. It is also possible and preferred to use at least one additional acceleration sensor 47. The sensor device 20 can also preferably be embodied as a speed sensor or comprise such a sensor.

After the determination of a characteristic value for the relative speed, the associated damping force and an appropriate spring force are set on the basis of the damper characteristic curve 10, stored in the memory device 45, of the shock absorber 100. An appropriate spring force can be determined by means of the rider's weight. For example, the rider's weight can be derived by automatically determining the spring compression position (sag) after a rider gets on. A suitable air pressure in the fluid spring or gas spring can be inferred from the spring compression travel when the rider gets on the bicycle, which pressure is then adjusted or approximated automatically, immediately or in the course of operation.

Furthermore, a detection device 408 is provided which is integrated here into the central control device 60 and is used to detect difficulties in the terrain. The detection device 408 can, however, also be embodied separately and be accommodated at any desired suitable location on the bicycle 200. The detection device 408 is assigned a sensor unit 403 which comprises an ultrasound sensor 424 which is mounted on the suspension fork 114. The sensor unit 403 is connected here to the detection device 408 via a line (not shown) or in a wireless fashion. During operation, the sensor unit 403 outputs an ultrasound signal and receives its reflection. The detection unit 408 evaluates the received signal and in this way detects whether the source of the reflection is a difficulty in the terrain. In this context, the reflected signal is also evaluated, in particular, by the detection device 408 in such a way that it is possible to characterize the difficulty in the terrain. As a result of a detected or characterized difficulty in the terrain, the detection device 408 sends a corresponding control signal to the central control device 60. Image evaluation of the images of a camera is also possible.

In reaction to a detected difficulty in the terrain, the detection device 408 actuates, in conjunction with the central control unit 60, the second damper device, embodied as a rear wheel damper 115, with a time offset with respect to the suspension fork 114. The time offset between the actuation of the suspension fork 114 and the rear wheel damper 115 is also determined by the detection device 408 in conjunction with the control device 60 and as a function of the velocity. In order to determine the velocity, corresponding sensors are arranged on at least one of the wheels 111, 112 and operatively connected to the central control device 60. The velocity can also be determined by means of a GPS signal.

FIG. 2 is a schematic illustration of the control circuit 12 which is stored in the memory device 45 and stored or programmed in the control device 46 or 60. The control circuit 12 is carried out periodically and, in particular, in a continuously periodic fashion, during operation. In step 52, a current relative movement or relative speed of the first component or connecting unit 101 with respect to the second component or connecting unit 102 is detected with the sensor device 20. In step 52, a characteristic value which is representative of the current relative speed is derived from the values of the sensor device 20 or. A relative speed is preferably used as the characteristic value.

The damper device (cf. FIG. 3*a* or 3*b*) of the shock absorber 100 has a damper device 1 with a first and a second damper chamber, between which a damping valve is arranged. The damping valve has at least one damping duct 7 which is subjected to a magnetic field of an electrical coil device, in order to influence the magneto-rheological medium or fluid (MRF) in the damping duct 7 and in this way set the desired damping force. A damper characteristic curve can be taken into account during the setting of the damping force.

In step 56, the associated damping force which is to be set is then subsequently derived from the current measured values while taking into account the predetermined or selected damper characteristic curve. A measure of the field strength or current strength which is to be currently set, and with which the damping force which is to be set is at least approximately attained, is derived therefrom. The measure can be the field strength itself or else, e.g., indicate the current strength with which the damping force to be set is at least approximately attained.

In the following step 70, the field strength which is to be currently set is generated or the corresponding current strength is applied to the electrical coil device 11 as a field-generating device, with the result that the damping force which is provided with the selected or predetermined damper characteristic curve for the current relative speed of the first connecting unit 101 with respect to the second connecting unit 102 is generated within an individual cycle or a time period of the control circuit 12. Subsequently, the next cycle starts, and step 52 is carried out again. The position or the spring force of the spring device 42 is checked in each cycle or at specific time intervals or when specific events occur.

For this purpose, in the case of the fluid spring 260 (cf. FIG. 3*a* or 3*b*) the strength of the spring force of the positive chamber 270 and the strength of the spring force of the negative chamber 280 are checked or determined. If a relatively hard fluid spring 261 is desired, for example the second positive chamber 272 can be switched off, with the result that the fluid spring 260 is given a steeper profile of the spring force. Alternatively, the volume of the negative chamber 280 is changed, or a position 292 of the equalization device 290 is changed.

The central control device 60 shown here is additionally operatively connected to the suspension fork according to the invention or the handlebars. The bicycle component 401 is composed of the detection device 408 and an ultrasound sensor 424. The ultrasound sensor 424 can emit an ultrasound signal here and also receive this signal again. The sensor 424 therefore combines a transmitter unit 413 and a receiver unit 423 in one component. As a result, particularly inconspicuous and space-saving mounting is possible. This is particularly advantageous in the case of racing cycles in which greater value is placed on a low weight and good aerodynamic properties. In addition, the external appearance of the bicycle 200 is not adversely affected either.

Alternatively, the detection device 408 can also be connected to an infrared sensor 434. A radar sensor 444 can also be provided. The detection device 408 also has an integrated memory device 418 here. It is therefore possible to store the detected difficulties in the terrain and the damper settings made in response thereto. These can then be retrieved later, e.g. by a user via a corresponding interface such as e.g. a smart phone 160. Furthermore, the detection device 408 accesses data of a sensor device 20 here. The detection device 408 takes into account the acquired values of the sensor device 20 here in order to be able to monitor the damper loadfactor.

Figure 3A:
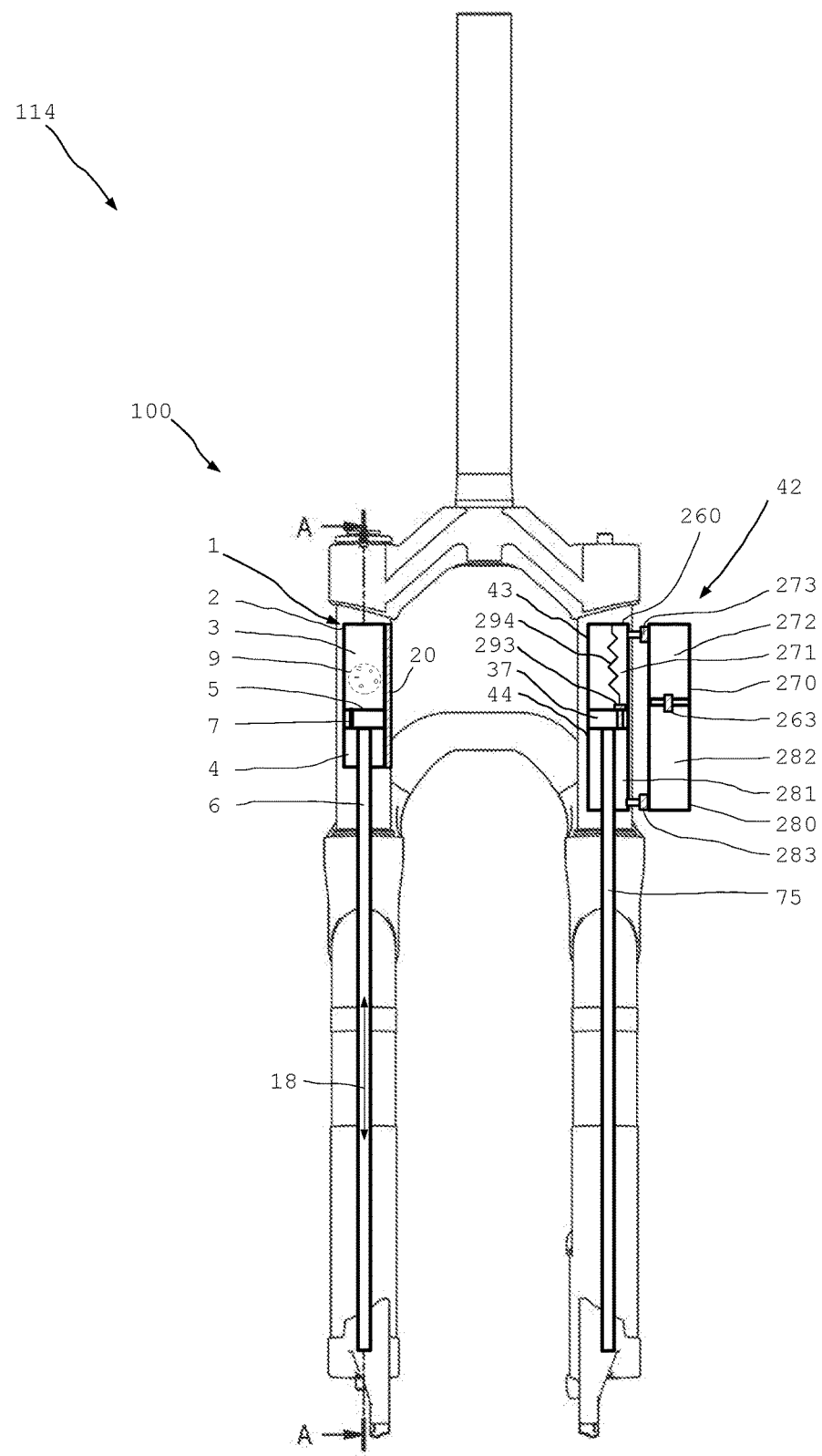
FIG. 3a shows a schematic view of a suspension fork of the bicycle according to FIG. 1.
Figure 3B:
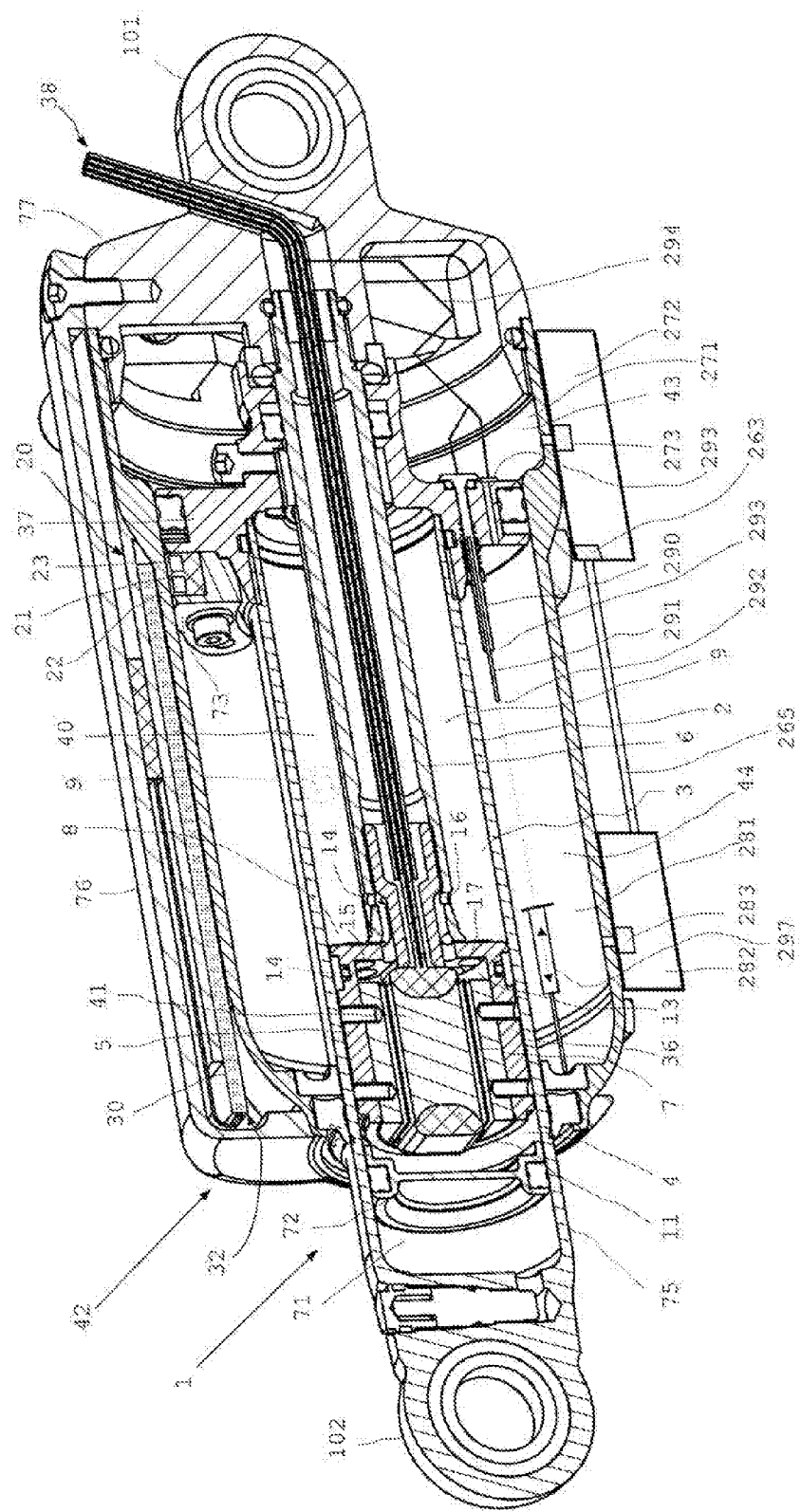
FIG. 3b shows a schematic sectional view of a shock absorber for the rear wheel of the bicycle according to FIG. 1.

FIG. 3*a* shows, in a highly schematic view, a suspension fork 114 which is applied for the front wheel 111, and FIG. 3*b* shows the rear wheel damper 115, which are described together below.

The suspension fork 114 has a shock absorber 100. The shock absorber 100 comprises a damper device 1 in a leg of the suspension fork and a spring device 42 in the other leg of the suspension fork. In other configurations, the damper device 1 and the spring device 42 can also be arranged together in one leg.

The shock absorber 100 is attached by the first end as a connecting unit 101 and the second end as a connecting unit 102 to different parts of the supporting device 120 or of the frame 113, in order to provide suspension and damping of relative movements.

The damper device 1 comprises a first damper chamber 3 and a second damper chamber 4 in a common damper housing 2. The two damper chambers 3 and 4 are separated from one another by the damper piston or damping piston 5, in or on which a magneto-rheological damping valve 8 has a dumping duct 7 through which the magneto-rheological damping fluid 9 (MRF) flows. While the damper housing 2 is attached to the upper part of the suspension fork 114 and therefore to the frame 113, the damper piston 5 is connected to the lower drop-out via the piston rod 6.

The spring device 42, which comprises here a spring unit 260 embodied as a fluid spring, is arranged in the other suspension strut of the suspension fork. The spring device has a housing in which the suspension piston 37 separates a positive chamber 270 from a negative chamber 280. The positive chamber 270 forms a positive spring and the negative chamber 280 forms a negative spring, the spring force of which is usually lower in the position of rest, but with which the spring force of the positive spring is opposed. As a result, a good response behavior is achieved, since the fluid spring reacts even in the case of small shocks. The fluid spring is filled with a fluid, here with gas, preferably air.

The positive spring comprises here two partial chambers 271 and 272 which can be separated from one another or connected to one another as necessary by a control valve 273.

The negative spring comprises here two partial chambers 281 and 282 which can be separated from one another or connected to one another as necessary by a control valve 283.

The partial chamber 272 of the positive chamber 270 and the partial chamber 282 of the negative chamber 280 can be connected to one another via the control valve 263. As a result, it is possible to use the control valves 263, 273 and 283 to perform pressure equalization between the positive chamber and the negative chamber at any desired spring position, as a result of which the respective characteristic of the fluid spring is changed. The control valves 263, 273 and 283 serve here as actuators which are activated under the control of the control device 60. As a result, the position of rest can be freely set, and a suspension fork can also be lowered, for example in the case of uphill travel. In the case of a rear wheel shock absorber, an additional volume which is, under certain circumstances, present, in a partial chamber can be eliminated by switching, and the suspension at the rear wheel can therefore be given a harder setting for uphill travel. It is possible to provide just one of the control valves 263, 273 and 283. For example, it is possible to provide only the control valve 273 (or 283), with the result that the volume of the positive chamber 270 (negative chamber 280) and therefore the spring characteristic of the spring unit 260 is changed by opening or closing the control valve 273 (or 283).

It is also possible for the suspension fork 114 to have just one control valve 293 in the suspension piston 37, which control valve 293 is connected to the control device 60 via a cable or a control line 294. By opening the control valve 293 it is possible to permit gas to be exchanged at any desired axial position of the suspension piston 37. Pressure equalization at a suitable location changes the position of rest and brings about e.g. lowering or transfer into the normal position if the suspension fork was lowered.

Through suitable control of the control valves it is also possible to influence the pressure level in the positive and/or negative chamber.

FIG. 3b shows, in a highly schematic view, a cross-section through a shock absorber 100, which is used here, for example, in the rear wheel damper 115.

The shock absorber 100 comprises a damper device 1. The shock absorber 100 is attached by the first end as a component 101 and the second end as a component 102 to different parts of the supporting device 120 or of the frame 113, in order to provide damping of relative movements.

A damping piston unit 40, which comprises a damping piston 5 with a damping valve 8 and a piston rod 6 connected thereto, is provided in the damper housing 2. The magneto-rheological damping valve 8 is provided in the damping piston 5, said damping valve 8 comprising here a field-generating device 26 and, in particular, an electrical coil 11, in order to generate a corresponding field strength. The magnetic field lines run here in the central region of the core 41 approximately perpendicularly to the longitudinal extent of the piston rod 6 and therefore pass approximately perpendicularly through the damping ducts 7. This causes the magneto-rheological fluid located in the damping ducts 7 to be effectively influenced, with the result that the through-flow through the damping valve 8 can be effectively damped. The shock absorber 100 comprises a first damper chamber 3 and a second damper chamber 4 which are separated from one another by the damping valve 8 which is embodied as a piston 5. In other configurations, an external damper valve 8 is also possible, said damper valve 8 being arranged outside the damper housing 2 and being connected via corresponding feed lines.

Toward the end 102, the first damper chamber 4 is adjoined by the equalization piston 72 and then by the equalization space 71. The equalization space 71 is preferably filled with a gas and serves to compensate the piston rod volume which enters the entire damper housing 2 when spring compression occurs.

Overall, magneto-rheological fluid 9 is located here as a field-sensitive medium not only in the damping valve 8 but also here in the two damping chambers 3 and 4.

The flow duct 7 between the first damper chamber 3 and the second damper chamber 4 extends from the second damper chamber 4 first through the fan-like damping ducts 7 which open at the other end into the collecting space 13 or into the collecting spaces 13. The magneto-rheological fluid collects there after exiting the damping ducts 7 before said fluid passes over into the first damping chamber 3 through the flow openings 14, 15. During spring compression, that is to say in the pressure stage, there is a flow through all the flow openings 14, 15 here. This means that the main part of the flow here passes through the flow openings 15, and the one-way valves 17 at the flow openings 15 open automatically, with the result that the magneto-rheological fluid can pass over from the second damper chamber 4 into the first damper chamber 3.

In the illustrated spring-compression state, the first damper chamber 3 is surrounded completely in the radial direction by the second spring chamber 44 of the spring device 42. As a result, a particularly compact design is made possible.

The shock absorber 100 can comprise an equalization device 290 which permits pressure equalization between the positive chamber 270 and the negative chamber 280. The position of the pressure equalization can be adjustable. For this purpose, the equalization device 290 can have e.g. a telescopic equalization plunger 291 which can be extended more or less from the suspension piston 37. As a result, the extendable equalization plunger 291 reaches a stop at the end of the negative chamber 280 earlier (or later). The equalization device 290 can be connected to the control device 46 or 60 via an electrical cable 294. If the equalization plunger 291 is triggered, it opens a fluid opening, with the result that gas equalization and therefore pressure equalization takes place between the positive chamber 270 and the negative chamber 280.

During the spring extension, the equalization device 290 closes again automatically. Depending on the position of the equalization, different pressure ratios, which correspondingly influence the chassis, are set at the fluid spring. It is also possible that an adjustable or movable stop for a fixed equalization plunger 291 is provided at the end of the negative chamber 280 in order to bring about variation of the spring characteristic. Alternatively or additionally to this, it is possible to provide a length-adjustable stop 297 against which the equalization plunger 291 abuts in an adjustable and variable position 292. If the equalization plunger 291 abuts, the equalization plunger 291 opens the control valve 293 and forms a flow opening through which a pressure equalization between the positive and negative chambers can take place. FIG. 3b shows a position 292 with the equalization plunger 291 extended. The equalization plunger 291 can also be retracted, resulting in a different position in which the equalization device 290 opens. A spring preferably acts on the equalization plunger 291.

Furthermore, an electrically controllable equalization valve 293, supplied with energy e.g. via the electrical cable 294, can also be provided in order to carry out partial or complete pressure equalization between the positive chamber 270 and the negative chamber 280 at suitable positions.

Furthermore, the positive chamber 270 can be composed of a plurality of partial chambers 271, 272. The partial chamber 272 can be connected when necessary or on request to the basic chamber as a partial chamber 271 in order to change the spring hardness and, in particular, reduce it. Conversely, the partial chamber 272 can also be switched off and disconnected from the partial chamber 271 if the spring hardness is to be changed, and in particular increased.

Analogously to this, the negative chamber 280 can be composed of a plurality of partial chambers 281, 282. The second partial chamber 282 can be connected to the first partial chamber 281 when necessary or on request. Correspondingly, the partial chamber 282 can also be switched off and disconnected from the partial chamber 281. In a further configuration, the positive chamber 270 comprises partial chambers 271 and 272, and the negative chamber 280 comprises partial chambers 281 and 282. The equalization device 290 comprises in this configuration control valves 273, 283 and 263 and a connecting line 265 which connects the partial chambers 271 and 282 to one another as required.

If the three control valves 273, 283 and 263 are opened, pressure equalization takes place between the positive chamber 270 and the negative chamber 280. The position 292 of pressure equalization can be selected here as desired and independently of an equalization plunger 291. Therefore, in such a configuration there is no need to provide an equalization plunger 291, a control valve 293 in the piston 37 or an adjustable stop 297. The suspension piston 37 is provided at the end of the damper housing 2.

In all cases, the connection and disconnection of the partial chambers can also be carried out as a function of the position during the spring compression or spring extension.

Both the shock absorber of the suspension fork 114 and the shock absorber for the rear wheel each have a sensor device 20 here. The sensor device 20 comprises in each case a detector head 21 and a scaling device 30 embodied in a structured fashion.

The scaling device 30 comprises here a sensor belt with permanent magnetic units as a field-generating unit. The poles of the permanent magnetic units alternate with the result that alternating north and south poles are arranged in the direction of movement of the detector 22. The magnetic field strength is evaluated by the detector head and the position 19 is determined therefrom. The design and function of the sensor device 20 will be explained in more detail below.

Figure 4:
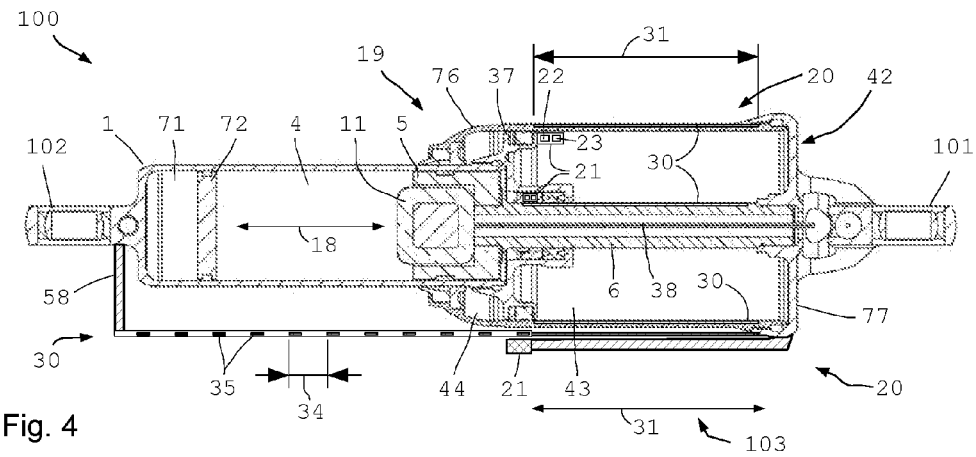
FIG. 4 shows a schematic sectional illustration of a further shock absorber for the bicycle according to FIG. 1.

A further exemplary embodiment of a shock absorber 100 is illustrated in FIG. 4, wherein for the sake of better clarity different variants of a sensor device 20, of which generally only one is installed, are shown.

The shock absorber 100 extends here between the connecting units 101 and 102 provided at the ends and comprises a damper device 1 and a spring device 42, which is embodied as an air spring and comprises a positive chamber 43 and a negative chamber 44. The damper device 1 comprises a first damper chamber 3 and a second damper chamber 4 which are separated from one another by a damping piston 5. A damping valve 8, or at least one damping valve 8, is provided in the damping piston 5 (outside the sectional plane and therefore not visible in FIG. 4). The damping valve 8 or the "open state" of the damping valve is actuated by means of an electrical coil device 11. The coil of the electrical coil device 11 is not wound around the piston rod 6 in the circumferential direction but rather about an axis extending transversely with respect to the longitudinal extent of the piston rod 6. A relative movement takes place here linearly and occurs in the direction of movement 18.

An equalization piston 72, which disconnects an equalization space 71, filled, in particular, with gas, for the volume of the piston rod is arranged in the damper housing 2.

The spring device 42 extends at least partially around the damper device 1 and comprises a spring housing 76. One end of the damper device 1 is connected to a suspension piston 7 30 or forms such a suspension piston 7. The suspension piston 7 separates the positive chamber 43 from a negative chamber 44.

The spring housing 76 is closed off with respect to the end of the connecting unit 101 by a cover 77. The connecting cable 38 for the electrical coil device 11 is also led out there. An electrical connecting cable for the sensor device 20 is also preferably led to the outside there.

The sensor device 20 comprises two sensor parts, specifically the detector head 21, which in the variant illustrated above the centerline is arranged inside the positive chamber 43 of the spring device 42. The sensor device 20 comprises as a further sensor part the scaling device 30 which is arranged or held on the spring housing 76 in different variants. Depending on the configuration and selection of material of the spring housing 76 and depending on the measuring principle of the sensor device 20, the scaling device 30 can be integrated into the internal or external wall or centrally into the wall of the spring housing 76. The scaling device 30 is preferably arranged on the inner wall of the spring housing 76, but can also be attached to or mounted on the outside of the spring housing 76.

Four variants are illustrated. In a first variant, the scaling device 30 is attached to the outside of the spring housing 76 and let, in particular, into a groove on the outside of the spring housing 76. The detector head 21 is located a relatively long way in the radial direction toward the outside in the positive chamber 43 of the spring device 42.

In a second illustrated variant, the scaling device 30 on the inside of the spring housing 76 is let in e.g. a groove on the inside of the spring housing 76 or directly into the wall of the spring housing 76. The detector head 21 is also located inside the positive chamber 43 of the spring device 42 a long way in the radial direction toward the outside.

In a third illustrated variant, the scaling device 30 is integrated into the piston rod of the suspension piston. The detector head 21 is also located inside the positive chamber 43 of the spring device 42, but preferably further toward the inside in the radial direction in this variant.

In the fourth illustrated variant, the scaling device 30 and the detector head 21 are located radially outside the spring housing 76.

In every case, the detector head 21 preferably comprises (at least) two detectors 22 and 23, which are arranged offset with respect to one another in the direction of movement 18 here. In every case, the scaling device 30 has a structure 32 which extends over a measuring section 31 and over which the physical properties of the scaling device 30 change periodically. Sensor sections 33 (cf. FIGS. 5 to 8) are preferably arranged on the scaling device 30 and have electrical and/or magnetic properties which respectively repeat and therefore form the structure 32 of the scaling device 30.

In this context it is possible, as already illustrated in FIG. 3b, for the scaling device 30 to have a multiplicity of permanent magnets whose poles are arranged in an alternating fashion, with the result that a north pole and a south pole alternate with one another.

In such a configuration, the detector head 21 is equipped with detectors 22 and 23 which detect a magnetic field. For example, the detectors 22 and 23 can be embodied as electrical coils or, for example, as Hall sensors in order to detect the intensity of a magnetic field.

If a relative movement of the connecting units 101 and 102 of the shock absorber 100 with respect to one another now takes place, the position 19 of the shock absorber 100 changes and the relative position of the detector head 21 relative to the scaling device 30 shifts. By evaluating the signal strength of a detector 22, 23 and, in particular, of at least two detectors 22, 23 it is therefore possible to infer the relative position of the detector head 21 relative to a sensor section 33 or with respect to the scaling device 30 or the absolute position within a sensor section 33. If two detectors are arranged offset with respect to one another in the direction of movement 18 and if both detectors detect the magnetic field of the scaling device 30, the position 19 and the direction of movement 18 can be determined very precisely by evaluating the signals.

During the continuous movement, the number of sensor sections or periods passed is stored in the memory device 45 of the control device 46, with the result that the absolute position 19 can be inferred. All that is required for this is for the measuring frequency to be so high that a complete sensor section is not moved past "unnoticed" during a measuring cycle.

In the variant in which the sensor device 20 is arranged completely outside the damper housing 2 and the spring housing 76, a mount 58 holds the scaling device 30 and connects the scaling device securely to one end or to a connecting unit 102 of the shock absorber 100. The detector head 21 is connected to the other end or the other connecting unit 101 of the shock absorber 100. The detector head 21 is secured in such a way that it is arranged in a contactless fashion at a short distance from the scaling device 30. In the case of a relative movement of the connecting units of the shock absorber 100, a relative movement of the scaling device 30 relative to the detector head 21 also occurs. A relative position can also be determined here by means of the measuring section 31, which preferably corresponds essentially to the damper stroke 103, by evaluating the field strengths.

By determining the intensity of the field strength it is possible to increase the resolution of the sensor device 20 considerably. In this context it is possible for the resolution for the determination of the position 19 to be smaller than a length 34 of a sensor section 33 by a factor of 50, 100, 500, 1000, 2000 or more. Factors which correspond to a power of 2, for example 128, 256, 512, 1024, 2048, 4096, 8192, 16384 or more are particularly preferred. This facilitates the (digital) processing of signals. As a result, when a structure 32 with sensor sections 33 in the millimeter range is used, a resolution in the micrometer range can be achieved.

The sensor device 20 comprises permanent magnets as field-generating units 35 on the scaling device 30, as illustrated in FIG. 3b. However, it is also possible that other physical and, in particular, magnetic and/or electrical properties also change over the length of the structure 32.

For example, the scaling device 30 can be formed at least partially from a ferromagnetic material, wherein the scaling device 30 has, for example at regular or predetermined intervals, on the ferromagnetic material, prongs, teeth, projections, grooves or other structures which can be used for determining positions. It is also possible for the scaling device to be composed, for example, in its entirety from an insulator 67 into which material conductors 66 are embedded at periodic intervals. The insulator 67 is, in particular, a non-conductor.

Various measuring principles of the sensor device 20 are explained below with reference to FIGS. 5 to 8.

Figure 5:
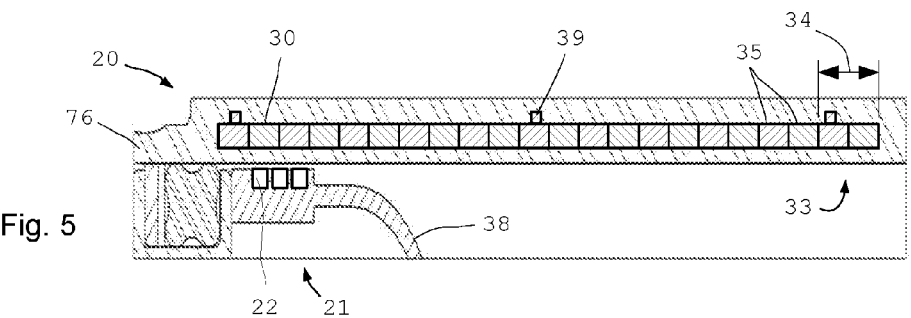
FIG. 5 shows the sensor device of the shock absorber according to FIG. 3a in an enlarged illustration.

In FIG. 5, a variant of the sensor device 20 is shown in which the structure 30 has permanent magnets as field-generating units 35. In this context, the poles of the field-generating units 35 are preferably arranged in an alternating fashion with the result that a magnetic field which changes periodically is produced over the measuring section 31 of the scaling device 30.

In FIG. 5, the detector head 21 is arranged in the interior of the spring housing 76, and the scaling device 30 is located integrated into the spring housing 76. Position marks 39 or the like are provided at specific intervals in order to make available specific calibration points for the calibration of the absolute position or else to permit absolute determination of positions by means of specific encoding operations. Separate end position sensors can also be provided in all cases.

The scaling device 30 can be composed of individual permanent magnets or embodied as a single magnet with alternating magnetization. A magnetic strip, made, for example, from plastic-bound magnetic material, is preferably used as the scaling device 30.

The scaling device 30 can be, in particular, part of the spring housing 76 or of some other part of the damper device 1 if this part is composed at least partially from a material with hard magnetic properties. In this case, the relative, and in certain designs also absolute, determination of positions can be carried out by means of locally different magnetization of the material.

One preferred embodiment provides for the scaling device 30 to be applied in the form of a hard magnetic coating to the spring housing 76. In this context, layer thicknesses of less than 1 mm or less than 100 μm and, in particular, less than 10 μm can be achieved and are sufficient for the determination of positions.

Figure 6:
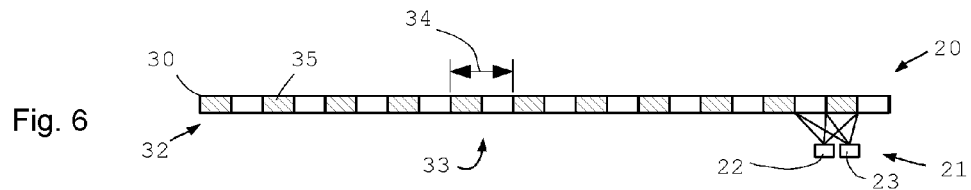
FIG. 6 shows an alternative sensor device for the shock absorbers of the bicycle according to FIG. 1.

FIG. 6 shows a variant in which permanent magnets 35 are also arranged at regular intervals on the scaling device 30. For example, in each case a non-magnetic material is provided between the permanent magnets 35. This also results in a periodically changing intensity of the magnetic field over the measuring section 31 of the scaling device 30. A detector head 21, also with two detectors 22, 23 here, is shown in a highly schematic form, wherein the detection angle is shown for the two detectors, in order to clarify that different intensities during the measurement are obtained with these detectors 22, 23 which are arranged offset in the direction of movement 18.

Figure 7:
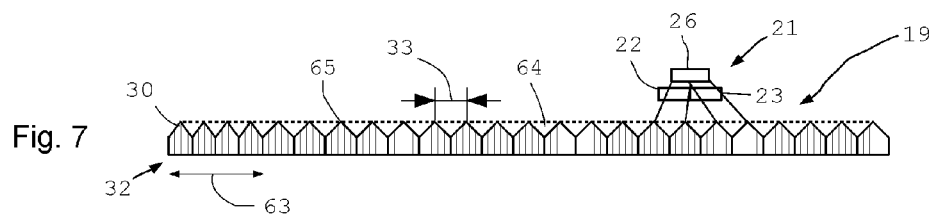
FIG. 7 shows a further sensor device for the shock absorbers of the bicycle according to FIG. 1.

FIG. 7 shows another configuration of the sensor device 20, in the structured scaling device 30 is, for example, embodied in a ferromagnetic fashion and does not make available a separate magnetic field, or essentially makes no such field available. Here, the outer shape of the ferromagnetic part of the scaling device 30 is provided with a regular structure, wherein tips 65 or prongs or other projections or depressions are provided at regular and/or predetermined intervals. The length 34 of a sensor section 33 is obtained here from the distance between two tips 65 or prongs or the like. In order to make available a smooth surface, the intermediate space between the tips 65 can be filled with a filler material 64.

In this variant, the detector head 21 preferably comprises in turn two magnetic field sensors or detectors 22 and 23. In addition, a magnetic field-generating device 26 is provided in the form of, for example, a permanent magnet. The magnetic field of the magnetic field-generating device 26 is influenced or "bent" by the structure 32 of the scaling device 30, with the result that different field strengths of the magnetic field of the magnetic field-generating device 26 are also produced here as a function of the position of the individual detectors 22 and 23, and said field strengths are detected by the detectors 22, 23. The detectors 22, 23 can also be embodied here, for example, as electrical coils or Hall sensors or the like.

At this point it is noted that in all configurations and exemplary embodiments the structure 32 of the scaling device 30 does not necessarily have to have the same lengths 34 of the sensor sections 33. It is also possible for some of the sensor sections 33 to have, for example, relatively short (or relatively long) sensor sections in one section 63. It is also possible for each individual sensor sections 33 to have a different length. Different lengths of the sensor section 33 can be appropriate, for example, in order to bring about automatically a higher resolution in the vicinity of an endpoint. Conversely, in other regions a relatively large distance or relatively large length of a sensor section 33 may be provided in order to make the sensor device 20 less sensitive there.

One preferred embodiment provides for the scaling device 30 to be configured in such a way that two or more parallel paths, which act as individual scales, run in the direction of movement 18. In this context, individual scales do not have to act uniformly over the entire length of the movement, for example when they are used as an index at the ends. The detector head 30 is then correspondingly configured and has at least one additional detector 22.

In this context, the position of the detector head 30 can also be determined absolutely by using two or more paths in the scaling device 30: either by means of digital encoding or else two paths with differing lengths of the respective sensor sections 33, similarly to the nonius in the case of calipers.

Figure 8:
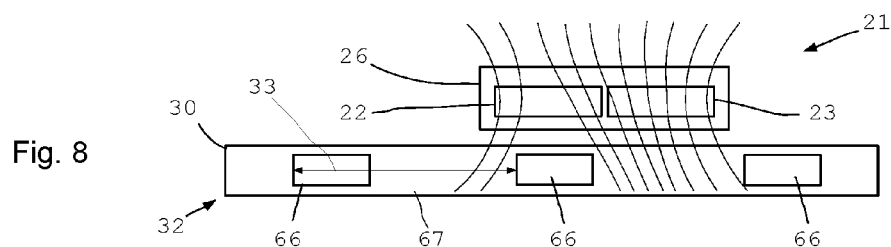
FIG. 8 shows another sensor device for the shock absorbers of the bicycle according to FIG. 1.

FIG. 8 also shows a configuration of a sensor device 20 in which the scaling device 30 does not have any magnetic parts here. The scaling device 30 has again a structure 32, wherein conductors 66 are inserted here at periodic intervals into a material which is non-conductive per se or a non-conductor 67. A length 34 of a sensor section 33 is also determined here by means of the distance between two conductors 66.

The detector head 21 has in this exemplary embodiment a magnetic field-generating device 26 which is designed to make available a magnetic alternating field. Furthermore, the detector head has at least one detector and, in particular, at least two detectors 22, 23 which are used in turn to detect magnetic fields or the intensity of magnetic fields.

In the case of the sensor device 20 in the exemplary embodiment according to FIG. 8, the magnetic field-generating device 26 generates an, in particular high-frequency, magnetic alternating field. As a result, eddy currents are generated in the conductors 66 and they in turn induce in the conductors 66 magnetic fields which are directed counter to the exciting magnetic field. As a result, the magnetic field is expelled from the conductors 66 and amplified between the conductors 66, with the result that in the illustration according to FIG. 8 the detector 23 receives a stronger signal than the detector 22. In the case of a further relative shift of the detector head 21 relative to the scaling device 30, the magnetic conditions change as a function of the position, with the result that the position 19 can be derived by means of the signals of the detectors 22, 23. Furthermore, it is also possible to infer the direction of movement 18.

Figure 9:
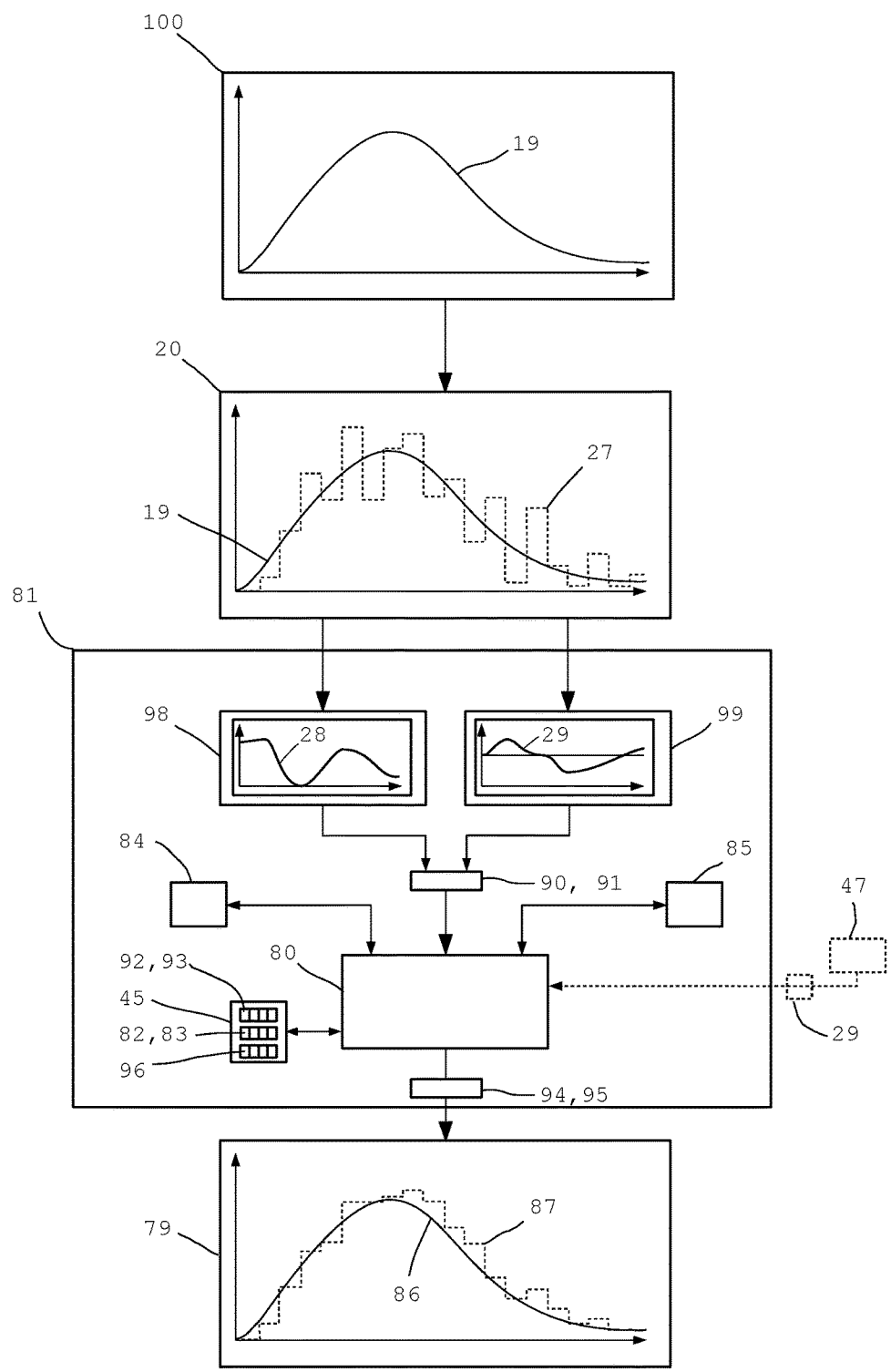
FIG. 9 shows a schematic illustration of the data pre-processing of the data measured with the sensor device.

The measured values which are obtained by means of the sensor device 20 are pre-processed according to the sequence illustrated in FIG. 9 in order to control at least one shock absorber 100 therewith.

The shock absorber 100 experiences a spring compression in the event of shocks, with the result that the position 19 of the connecting units 101, 102 relative to one another changes correspondingly. The sensor device 20 operates primarily as a travel sensor and derives a corresponding signal profile of the sensor signals 27 from the time profile of the position 19. In this context, the signal is digitized and already experiences digitization noise as a result. Furthermore, other effects can also contribute to the production and/or increase of the noise. Unsuitable filtering can also amplify the noise. Therefore, a suitable algorithm is important.

After the detection of the travel signal 27, the travel signal 27 of the speed signal 28 is differentiated in a computing unit 98 in order to obtain said speed signal 28. In addition, in a computing unit 99 for determining an acceleration signal 29 either the travel signal 27 can be derived twice or the speed signal 28 is derived once in order to obtain the acceleration signal 29.

The speed signal 28 and the acceleration signal 29 form together a measured value data set 90, or a measured value data set 91 at the next pass. The measured value data sets are fed to a filter device 80 and can be stored directly in a memory device 45. The measured value data sets 90, 91 are analyzed successively in the filter device 80. A corresponding filter parameter set 82 or 83 etc. is selected or derived as a function of the values of a measured value data set 90, and a control data set 94 is derived from the measured value data set 90 with the corresponding determined filter parameter set 82, 83 using a suitable filter algorithm.

It is possible and preferred that in the case of a measurement data set 91 the filter parameter set is determined with the preceding measurement data set 90, since owing to the high measuring frequency it is assumed that from one measurement data set to the next measurement data set the values do not change to such an extent that it is necessary to re-determine a filter parameter set.

However, it is also possible and preferred that a measurement data set 91 is stored in a pre-processed form or in a direct, non-pre-processed form in the memory device 45 as a stored data set 93. A filter parameter set 82, 83 can be selected with the data set 93 which is now stored. Using the filter parameter set, a corresponding control data set 95 can be calculated with the corresponding filter, for example a Kalman filter 84 or an average value former 85 or some other filter algorithm or with other filter devices.

After the calculation of the control data set 95, it can be iteratively checked whether the associated filter parameter set was the correct filter parameter set. In any case or in many cases or when certain deviations are exceeded, renewed determination of a suitable filter parameter set can be carried out in order therefore subsequently to derive the current control data set 95 again. Such iteration can take place once or can be carried out repeatedly and can be limited to a maximum number of passes.

In addition, an acceleration signal 29 of a separate acceleration sensor 47 can also be fed to the filter device. Therefore, the acceleration of the two-wheeled vehicle can also be taken into account overall.

During the determination of a suitable filter parameter set 82, 83, it is possible that two or more different filter parameter sets 82, 83 are provided, wherein the selection of a filter parameter set 82, 83 preferably takes place according to whether the speed signal exceeds a specific value or not. In addition, it is possible and is particularly preferred also to use the acceleration signal to decide about a suitable filter parameter set.

In the exemplary embodiment, both the speed signal and acceleration signal are used to select a suitable filter parameter set.

In simple cases, filtering is carried out by forming average values, wherein different filter parameter sets can differ by virtue of the fact that the number of measured values taken into account is varied. If, for example, low speeds and low acceleration values are present, more measured values can also be taken into account from the past than in the case of high speeds or high accelerations, since otherwise in the case of high speeds and high accelerations a significant and, under certain circumstances, damaging delay can occur during the reaction of the shock absorber 100. Conversely, relatively strong smoothing of measured values in the case of low speeds and low accelerations causes digitization noise to be filtered out more strongly, as a result of which the response behavior remains clean even in the case of small and very small shocks.

Finally, FIG. 9 is a diagram 79 in which the real speed 86 and the speed 87 used for control are plotted schematically. The deviations between the curves are small as a result of the analysis of the measured values and the corresponding consideration of a filter parameter set.

A Kalman filter is particularly preferably used in all the configurations. The filter parameter set is determined for the preferred Kalman filter as follows:

The (noisy) measured speed "Vr" and the (noisy) measured acceleration "Ar" of the connecting units with respect to one another are transferred to the filter algorithm here. The values for Vr and Ar are measured by the sensor device 20 or derived therefrom. The speed signal and the acceleration signal can be derived from the sensor signal. The acceleration signal can also be determined directly by means of a separate acceleration sensor 47.

The estimated or derived speed "Vg" (reference symbol 87) and, if appropriate, the estimated acceleration "Ag" of the relative movement of the connecting units are determined from the above using the Kalman filter. Here, the values Vr and Ar are specified in SI units and consequently in "m/s" and "m/s2", respectively.

At first, variables "Q0" and "R" and "Vg" and "P" are defined. At the first pass of the filter algorithm, starting values are defined, here preferably Q0=0.01 and R=5 and Vg=0 and P=1 are set. Vg corresponds to the estimated or derived speed 87 of the relative movement of the connecting units with respect to one another, said speed 87 being used for the determination of the damping.

Subsequently, at each pass the filter parameter set is determined, and values are determined for Q, Pp, K, Vg and P. The parameters of the filter parameter set 82, 83 depend on the measured (noisy) values. In this respect, it is decided whether the mathematical absolute value of the acceleration "Ar" which is measured (with noise) is larger than a predefined threshold value, preferably 5 here. The speed "Vg" which is estimated or derived in the previous pass (from the stored data set 92), is defined as a value Vp by means of Vp=Vg (from the last loop).

Furthermore, it is determined whether the mathematical absolute value of the value Vp (estimated speed Vg of the relative movement of the connecting units with respect to one another in the last pass) is higher than a further threshold value, preferably 0.1 here.

Even if only one of the conditions applies, the parameter "Q" is set to a predefined value, here Q=2. If no condition applies, Q is set to another predefined value, specifically here to Q=Q0 and therefore to Q=0.01.

After this, values Pp, K, Vg and P are determined as $$Pp=P+Q.$$

$$K=Pp*1/(Pp+R)$$

$$Vg=Vp+K*(Vr-Vp)$$

$$P=(1-K)*Pp$$

An estimated speed "Vg" (reference symbol 87 in FIG. 8) is fed back as a result of the filter algorithm or the filter function. An estimated acceleration "Ag" can also be determined and fed back. The filter parameters and calculated values are stored as a filter parameter set 83 at least up to the next pass. At the next pass, the filter parameter set 83 becomes the filter parameter set 82.

The speed 87 is then used for control.

Figure 10A:
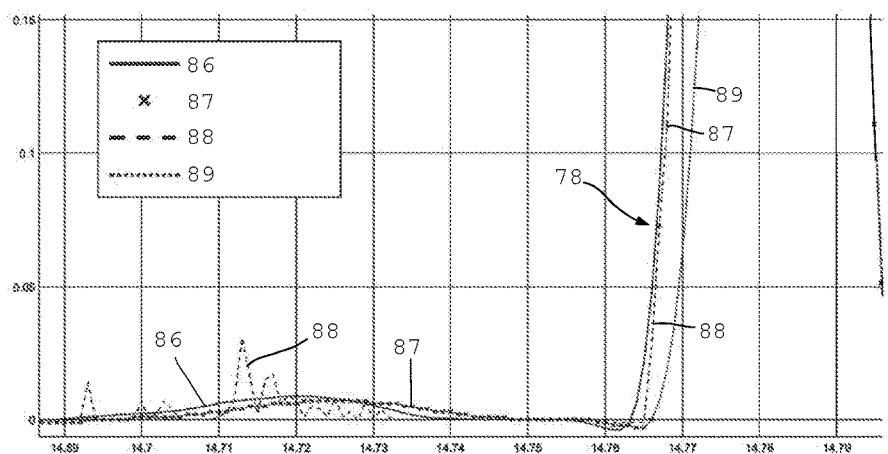
FIGS. 10a to 10c show real measurement data of the shock absorber according to FIG. 4.
Figure 10B:
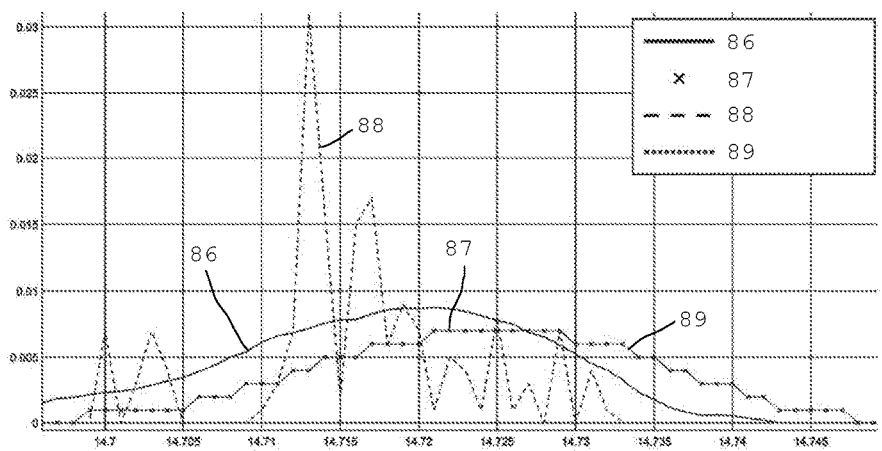
Figure 10C:
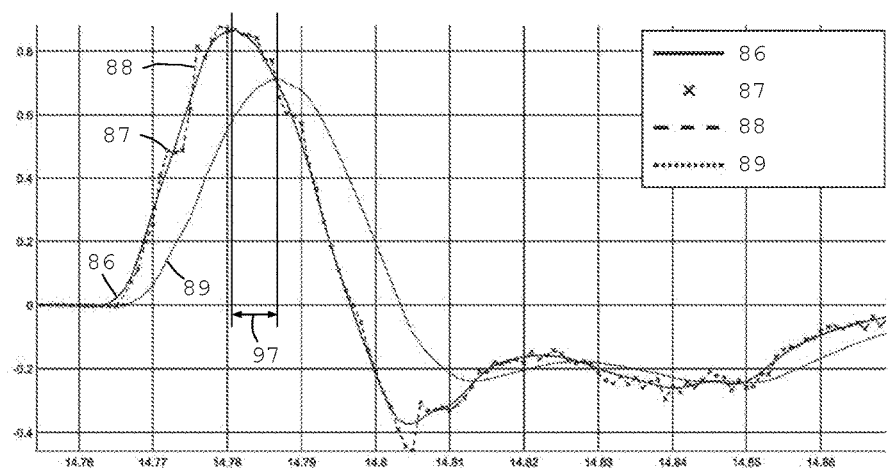

Finally, real values which have been recorded with the shock absorber according to FIG. 4 are plotted in FIGS. 10a to 10c.

In this context, FIG. 10a shows the time sequence over somewhat more than one 10th of a second, within which initially only very low speeds are present, while a relatively large shock occurs toward the end of the displayed time period.

The real speed 86, which was also determined by means of additional sensors and which was subsequently determined in a costly fashion after the measurement, is shown by a continuous line. In the normal travel mode, the real speed 86 is not available with the measuring quality for the control. The real speed 86 is presented here only for the purpose of comparison.

The dashed line 88 shows the speed 88 which was filtered with a first filter parameter set 82 and at the start of the illustrated measuring time period deviates considerably from the real speed 86.

The dotted line 89 shows the speed profile which was determined with a second filter parameter set 83 with relatively strong filtering. At the start of the measuring time period, the curve 89 shows a considerably smoother profile than the curve 88 illustrated by a dashed line. The deviations from the profile of the real speed 86 are relatively small. Although a slight time offset can be seen, it is not significant in the case of these small shocks.

At the start of a relatively strong shock at approximately 14.76 seconds, the profile of the real speed 86 rises very steeply. The dashed curve 88 follows the real speed profile 86 virtually without delay, while the dotted line 89 has a significant time offset.

As a result of the criteria of the analysis of the measured values, switching over of the filter parameter sets is carried out here during the processing of the measured values, wherein up to approximately 14.765 seconds the dotted curve profile 89 is used for the control, and in which switching from the curve 89 to the curve 88 takes place starting at approximately 14.765 seconds. The switching time 78 is shown. At this time, the measured speed and/or the measured acceleration have exceeded a predetermined amount, and a different filter parameter set is therefore selected. In all cases, more than two filter parameter sets are also possible, for example one with low filtering or smoothing, one with medium filtering or smoothing and one with relatively strong filtering or smoothing.

The control profile is represented by the crosses 87 which are shown, wherein the crosses 87 firstly lie on the curve 89 (relatively strong smoothing) and later on the curve 88 (relatively weak smoothing). It is therefore possible for sufficient correspondence and high accuracy to be achieved over the entire measuring range.

In particularly simple cases, for example relatively strong smoothing can comprise simple averaging of the last five or ten measured values, while in the case of relatively weak smoothing only the last two or three values are averaged. In this context, the intensity of the weighting can depend on the time interval (weighting of, for example, 25%, 50 and 100% for the penultimate measured value, the last measured value and the current value).

FIG. 10b shows the first time segment from FIG. 9 in an enlarged view, with the result that the deviations of curve 88 from the real speed profile 86 can be seen very clearly. At the time of approximately 14.713 seconds on the curve 88, a speed value which is four times as high as the speed value which is actually present in reality is output. At this time, a deviation of the curve 89 from the real speed 86 is very much smaller.

FIG. 10c shows the profile of the relatively strong shock at the end of the time period illustrated in FIG. 10a, wherein a good degree of correspondence between the curve profiles 88 and the real speed profile 86 can be seen here. The time offset 97 between the maximum of the real speed profile 86 and the maximum of the curve 89 is much more than 5 ms and is too large to be able to make available optimum damping properties for such shocks.

Overall, the invention provides a sufficiently fast and smooth response behavior which is respectively adapted, and therefore an improved chassis controller 300 in all power ranges of the shock absorbers 100, by means of a sensor device 20 with high measuring resolution and by means of the filtering of the measurement data, wherein the filter parameters are selected as a function of the measurement data.

LIST OF REFERENCE SYMBOLS

1 Damper device
2 Damper housing
3 First damper chamber
4 Second damper chamber
5 Damping piston
6 Piston rod
7 Damping duct, flow duct
8 Damping valve
9 MRF
10 Damper characteristic curve
11 Electrical coil device
12 Control circuit
13 Collecting space
14,15 Flow opening
16 Through-opening
17 One-way valve
18 Direction of movement
19 Position
20 Sensor device
21 Detector head
22,23 Detector operator
26 Magnetic field-generating device
27 Sensor signal
28 Speed signal
29 Acceleration signal
30 Scaling device
31 Measuring section
32 Structure
33 Sensor section
34 Length
35 Field-generating unit
36 Annular conductor
37 Suspension piston
38 Cable
39 Position mark
40 Damping piston unit
41 Core
42 Spring device
43 Positive chamber
44 Negative chamber
45 Memory device
46 Control device
47 Acceleration sensor
48 Data
49 Display
50 Damper characteristic curve
52 Step
53 Internet
54 Network interface
55 Radio network interface
56 Step
57 Touchscreen, graphic operator control unit
58 Mount
60 Control device
61 Battery unit
63 Section
64 Filler material
65 Tip
66 Conductor
67 Insulator
70 Step
71 Equalization space
72 Equalization piston
73 Mount
75 Piston rod
76 Spring housing
77 Cover
78 Switching point
79 Diagram
80 Filter device
81 Analysis device
82,83 Filter parameter set
84 Kalman filter
85 Average value former
86 Real speed
87 Speed used
88,89 Speed
90,91 Measurement data set
92,93 Stored data set
94,95 Control data set
96 Limiting value set
97 Time offset
98,99 Computing unit
100 Shock absorber
101,102 Connecting unit
103 Damper stroke
111 Wheel, front wheel
112 Wheel, rear wheel
113 Frame
114 Suspension fork
115 Rear wheel damper
116 Handlebars
117 Saddle
120 Supporting device
150 Operator control device
151 Activation device
152 Adjustment device
153 Mechanical input unit
154-156 Operator control element
160 Smart phone
161-162 Region
200 Two-wheeled vehicle
260 Spring unit
263 Control valve
265 Line
270 Positive chamber
271,272 Partial chamber
273 Control valve
280 Negative chamber
281,282 Partial chamber
283 Control valve
290 Equalization device 291 Equalization plunger
292 Position
293 Equalization valve
294 Cable, control line
297 Stop
300 Chassis controller
401 Bicycle component
408 Detection device
413 Transmitter unit
418 Memory device
423 Receiver unit
424 Ultrasound sensor
433 Mounting device
434 Infrared sensor
444 Radar sensor

The invention claimed is:

1. A chassis controller for an at least partially human-powered two-wheeled vehicle, comprising:
at least one controllable shock absorber having two connecting units configured to move relative to one another, at least one damper device with a damper housing and at least one spring device with a spring housing disposed for absorbing shocks between said two connecting units;
a control device for controlling said shock absorber;
at least one sensor device disposed for acquiring measurement data relating to a relative movement of said connecting units with respect to one another;
said sensor device including at least one scaling device connected to a first of said two connecting units of said shock absorber, and said sensor device extending over a measuring section in a direction of the relative movement;
said scaling device having a structure with magnetic properties that repeat periodically over said measuring section; and
said sensor device including a detector head connected to a second of said two connecting units and disposed to interact with said scaling device and to determine a position of said shock absorber.

2. The chassis controller according to claim 1, wherein said damper device has a first damper chamber, at least one second damper chamber, and at least one damping valve coupling said first damper chamber and said at least one second damper chamber to one another.

3. The chassis controller according to claim 2, wherein said at least one damping valve is assigned at least one magnetic field-generating device which serves to generate and control a magnetic field in at least one damping duct of said damping valve, and said damping duct contains a magneto-rheological medium.

4. The chassis controller according to claim 1, wherein said detector head is disposed adjacent said scaling device.

5. The chassis controller according to claim 1, wherein each sensor section has a length of at least 0.25 mm in the direction of movement.

6. The chassis controller according to claim 1, wherein the measuring section of said scaling device in the direction of movement corresponds substantially to a damper stroke.

7. The chassis controller according to claim 1, wherein said detector head comprises a multiplicity of detectors whose detector signals can be evaluated.

8. The chassis controller according to claim 7, wherein said detector head comprises a multiplicity of detectors that are arranged offset in the direction of movement and whose detector signals can be evaluated.

9. The chassis controller according to claim 7, wherein a signal strength of the individual detector signals is evaluated in order to permit a position to be determined with a spatial resolution which is less than a length of a respective sensor section.

10. The chassis controller according to claim 9, wherein a ratio of a length of a sensor section to a spatial resolution of the determination of the position is greater than 100 or greater than 1000.

11. The chassis controller according to claim 1, wherein said sensor device is configured to evaluate the signals of at least one detector such that variables selected from the group consisting of an absolute position, a relative position, a speed, a direction, an acceleration and a jolt which are dependent on the position or movement of the shock absorber can be output via an interface.

12. The chassis controller according to claim 1, wherein said scaling device comprises a multiplicity of field-generating units.

13. The chassis controller according to claim 12, wherein said scaling device comprises a multiplicity of permanent magnets being magnetic field-generating units.

14. The chassis controller according to claim 13, wherein a plurality of mutually adjacent magnet units have a different polarity.

15. The chassis controller according to claim 1, wherein said scaling device is at least partially ferromagnetic and said scaling device has a periodic and ferromagnetically embodied structure.

16. The chassis controller according to claim 1, wherein said scaling device has a ladder structure or toothed structure.

17. The chassis controller according to claim 1, wherein at least one magnetic field-generating device is disposed on said detector head.

18. The chassis controller according to claim 17, wherein said detector head configured to generate a magnetic alternating field with said magnetic field-generating device, and wherein said detector head is configured to detect a field strength of the magnetic alternating field which is influenced by said scaling device, in order to derive the position of the shock absorber from the field strength.

19. The chassis controller according to claim 1, wherein said spring housing at least partially surrounds said damper device.

20. The chassis controller according to claim 18, wherein said detector head is arranged at least partially within said spring housing.

21. The chassis controller according to claim 18, wherein said damper device is connected to a suspension piston which divides an air chamber into a positive chamber and a negative chamber.

22. The chassis controller according to claim 1, wherein said detector head is attached to said suspension piston.

23. The chassis controller according to claim 18, wherein at least a substantial portion of said spring housing is composed of a light metal.

24. The chassis controller according to claim 18, wherein at least a substantial portion of said spring housing is composed of a composite fiber material.

25. The chassis controller according to claim 18, wherein said scaling device is attached to said spring housing or is integrated therein.

26. The chassis controller according to claim 25, wherein said scaling device is attached to an outside of said spring housing.

27. The chassis controller according to claim 25, wherein said scaling device is integrated into said spring housing.

28. The chassis controller according to claim 1, wherein said scaling device and said detector head are attached to an outside of said shock absorber.

29. The chassis controller according to claim 1, wherein said scaling device has additional absolute position marks.

30. The chassis controller according to claim 1, wherein said scaling device can be divided physically or virtually into at least two paths which are parallel in the direction of movement, by way of different magnetic encoding.

* * * * *